(12) United States Patent
Beckert et al.

(10) Patent No.: US 12,212,233 B2
(45) Date of Patent: Jan. 28, 2025

(54) SWITCHING DEVICE FOR A DC VOLTAGE CIRCUIT

(71) Applicant: Siemens Aktiengesellschaft, Munich (DE)

(72) Inventors: Thomas Beckert, Nuremberg (DE); Peter Koellensperger, Heroldsberg (DE); Hauke Nannen, Nuremberg (DE); Hubert Schierling, Erlangen (DE); Dieter Waegele, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 17/440,313

(22) PCT Filed: Mar. 13, 2020

(86) PCT No.: PCT/EP2020/056751
§ 371 (c)(1),
(2) Date: Sep. 17, 2021

(87) PCT Pub. No.: WO2020/193168
PCT Pub. Date: Oct. 1, 2020

(65) Prior Publication Data
US 2022/0149727 A1 May 12, 2022

(30) Foreign Application Priority Data

Mar. 22, 2019 (DE) .................... 10 2019 203 982.0

(51) Int. Cl.
*H02M 3/155* (2006.01)
*H02H 7/26* (2006.01)
*H02M 1/32* (2007.01)

(52) U.S. Cl.
CPC .............. *H02M 3/155* (2013.01); *H02H 7/26* (2013.01); *H02M 1/32* (2013.01)

(58) Field of Classification Search
CPC . H02J 1/00; H02H 7/26; H03K 17/08; H02M 3/155; H02M 1/32
See application file for complete search history.

(56) References Cited

U.S. PATENT DOCUMENTS 5,737,161 A * 4/1998 Thomas .................... H02H 9/02
361/13
9,705,313 B2 * 7/2017 Yamada ................ H02M 7/537
(Continued)

FOREIGN PATENT DOCUMENTS

CN 101355296 A 1/2009
CN 102687221 A 9/2012
(Continued)

OTHER PUBLICATIONS

PCT International Search Report and Written Opinion of International Searching Authority mailed Jul. 3, 2020 corresponding to PCT International Application No. PCT/EP2020/056751 filed Mar. 13, 2020.
(Continued)

*Primary Examiner* — Thienvu V Tran
*Assistant Examiner* — Yahveh Comas Torres
(74) *Attorney, Agent, or Firm* — Harness, Dickey & Pierce, P.L.C.

(57) ABSTRACT

A switching device is for coupling a DC voltage branch to a DC voltage bus. The switching device includes a series circuit including a first switching module and a second switching module. A first diode is connected in parallel with the first semiconductor switching element and a second diode is connected in parallel with the second semiconductor switching element. A third semiconductor switching element
(Continued)

is connected in parallel with the series circuit. A control device is connected to the first and second semiconductor switching elements, to the bridging semiconductor switching element, to the voltage sensor and to the current sensor. The control device is configured to, upon a first threshold value of the voltage being undershot and current flowing in an exceptional case, switch the bridging semiconductor switching element to the conducting state in order to facilitate a current flow from the DC voltage branch to the DC voltage bus.

12 Claims, 5 Drawing Sheets

(56) References Cited

U.S. PATENT DOCUMENTS

| | | | | |
|---|---|---|---|---|
| 10,139,846 | B2 * | 11/2018 | Motsenbocker | H02J 1/08 |
| 11,437,987 | B2 * | 9/2022 | Köllensperger | H02H 3/023 |
| 2012/0299393 | A1 * | 11/2012 | Hafner | H01H 9/542 |
| | | | | 307/113 |
| 2014/0002943 | A1 * | 1/2014 | Berggren | H02H 9/02 |
| | | | | 361/93.9 |
| 2015/0229121 | A1 | 8/2015 | Davidson | |
| 2018/0076727 | A1 | 3/2018 | Bakran et al. | |

FOREIGN PATENT DOCUMENTS

| | | | | |
|---|---|---|---|---|
| CN | 104756339 | A | 7/2015 | |
| CN | 106099878 | A | 11/2016 | |
| CN | 107580737 | A | 1/2018 | |
| CN | 108123423 | A * | 6/2018 | H02H 7/26 |
| CN | 108418192 | A * | 8/2018 | H03K 17/08116 |
| EP | 2701255 | A1 | 2/2014 | |
| EP | 3057232 | A1 * | 8/2016 | H02H 7/26 |
| WO | WO 2011057675 | A1 | 5/2011 | |
| WO | WO-2012123015 | A1 * | 9/2012 | H02H 7/268 |
| WO | WO-2018172134 | A1 * | 9/2018 | H03K 17/08128 |

OTHER PUBLICATIONS

German Office Action dated Feb. 26, 2020.

* cited by examiner

PRIOR ART

SWITCHING DEVICE FOR A DC VOLTAGE CIRCUIT

PRIORITY STATEMENT

This application is the national phase under 35 U.S.C. § 371 of PCT International Application No. PCT/EP2020/056751 which has an International filing date of Mar. 13, 2020, which claims priority to German patent application DE 10 2019 203 982.0 filed Mar. 22, 2019, the entire contents of each of which are hereby incorporated herein by reference.

FIELD

Embodiments of the present application generally relate to a switching device for coupling a DC voltage branch to a DC voltage bus.

BACKGROUND

DC voltage is used to mean voltages of up to 1500 volts. DC voltages up to this level are also referred to as low voltage. More specifically, DC voltage is used to mean, in particular, voltages which are greater than the extra-low voltage of 120 volts DC. DC voltage is used to mean voltages of 400-800 volts, in particular.

A DC voltage circuit or DC circuit is used to mean circuits for currents, in particular nominal currents or maximum currents, of 2 to 1000 or 5000 amps; more specifically for currents of 2 amps to 400 amps or 200 amps.

A DC voltage bus is used to mean an at least two-conductor system having a positive conductor and a negative conductor, which system is supplied with DC voltage by at least one energy source. A DC voltage device, for example a DC voltage load, a load, an inverter, a combined energy sink or energy source, a pure (further) energy source, etc., is connected to the DC voltage bus via a DC voltage branch in each case. A plurality of DC voltage devices may also be connected to a DC voltage branch.

A DC voltage device is used to mean, in particular, a device having a power of 1 kilowatt to 500 kilowatts.

In the meantime, DC voltage circuits, also referred to as DC voltage networks or low-voltage DC networks, have been increasingly developed and constructed and usually have a DC voltage bus with DC voltage branches.

The DC voltage branches, also referred to as load feeders, are usually protected using a DC voltage switch (DC switch), referred to as a switching device in the present case. This switching device has at least one switching module, usually two switching modules, having at least one controllable semiconductor switching element, also referred to as a power electronic switching element, which may have a diode connected in parallel with it.

The European patent application EP 3 057 232 A1 proposes a circuit breaker apparatus for interrupting a current flow in a circuit and a method for interrupting the current flow using such a circuit breaker apparatus. The circuit breaker apparatus comprises a first switch arrangement having a first silicon-based semiconductor switch and a second silicon-based semiconductor switch which are connected to one another in an anti-symmetrical manner. The circuit breaker apparatus also comprises a second switch arrangement having a first wide bandgap semiconductor switch and a second wide bandgap semiconductor switch which are connected in series in a back-to-back arrangement. The first switch arrangement is arranged parallel to the second switch arrangement.

The Chinese published patent application CN 108 418 192 A relates to the technical field of energy transmission and distribution and relates, in particular, to a DC limiter and to a coordinated control method thereof and to a DC circuit breaker. A DC limiter is distinguished by the fact that it comprises the following: a first current flow branch for conducting the steady-state current of the DC line during normal operation of the DC line and for detecting the failure of the DC line if a fault occurs. The current is transmitted to the first transmission branch: the first transmission branch is used to transmit the fault current on the first flow branch to the current limiting branch: the current limiting branch is used to conduct the fault current and to connect the current limitation for the DC line.

The function of the controllable semiconductor switching element and of the diode connected in parallel may also be physically implemented in a semiconductor component. Such a component is referred to as reverse-conducting.

A safety fuse may also be present.

A switching device for coupling a DC voltage branch to a DC voltage bus according to the prior art is shown in FIG. 1.

FIG. 1 shows a DC voltage bus DCB having a positive conductor DCP and a negative conductor DCN which are connected to a DC voltage energy source (not illustrated), for example having a DC voltage of 600 volts.

A first DC voltage branch DCA1, a second DC voltage branch DCA2 and a third DC voltage branch DCA3 are provided on the DC voltage bus DCB; further DC voltage branches may be provided.

The first DC voltage branch DCA1 is connected to a first device G1 via a first switching device SCH1, and the second DC voltage branch DCA2 is likewise connected to a second device G2 via a second switching device SCH2.

The first switching device SCH1 has a series circuit comprising a first switching module SM1 and a second switching module SM2. The first switching module SM1 has a first controllable semiconductor switching element Q1 for a first current direction, and the second switching module SM2 has a second controllable semiconductor switching element Q2 for the opposite current direction.

A first diode D1 which is in the conducting state in the opposite current direction to the first semiconductor switching element Q1 is connected in parallel with the first semiconductor switching element Q1, and a second diode D2 which is in the conducting state in the first current direction of the first semiconductor switching element Q1 is connected in parallel with the second semiconductor switching element Q2.

The first switching device SCH1 is designed with two-pole connections (for the positive and negative conductors); in the example, the first and second switching modules SM1, SM2 are in one conductor, in the positive conductor of the first DC voltage branch DCA1 in the example; the negative conductor is implemented and does not have any switching modules. Alternatively, the switching modules SM1, SM2 may also be arranged in the negative conductor or both conductors may have switching modules.

The series circuit comprising the two switching modules SM1, SM2 is followed, on the device side or DC voltage branch side, by an isolating contact, wherein a first isolating contact TK1 is provided for the positive conductor and a second isolating contact TK2 is provided for the negative conductor, generally referred to as an isolating contact or isolating contacts, for the DC-isolation of the device or a load.

The second switching device SCH2 is constructed in a similar manner. Further switching devices may be constructed in a similar manner.

The device G1, G2 is usually a DC voltage device having an electrical capacitance. In the example, the first device G1 has the first capacitance C1, and the second device G2 has the second capacitance C2. Significant amounts of energy are often stored in the capacitances of the (DC voltage) devices.

If a fault occurs in the DC voltage circuit/DC voltage network or DC network according to FIG. 1, for example a short circuit at the fault location F1 which is situated between the second switching device SCH2 and the second device G2, the short circuit there is fed from the surrounding DC voltage branches or DC branches and the energy sources or capacitances (of the devices) situated therein. This results in a high current in the associated switching device, the second switching device SCH2 in the example, which trips with a disconnection.

In this case, the important factor is that the other switching devices or switches do not trip, with the result that so-called selective disconnection of the fault takes place.

Furthermore, the other switching devices are intended to hinder the current flow from the respective DC voltage branch or load feeder to the short circuit as little as possible so that the switching device, the second switching device SCH2 in the example, trips safely. A semiconductor which can be switched off, for example an insulated gate bipolar transistor, IGBT for short, is therefore rather obstructive in the switching devices since they usually have a desaturation behavior and have a current-limiting effect. Furthermore, these semiconductor switches would switch off very quickly, generally in the single-digit µs range.

If a short circuit occurs at the fault location F1, the energy in the second capacitance C2 (or in the second capacitor C2) of the affected second device G2 will discharge into the fault location. In addition, the energy in the first capacitance C1 and in a possible third capacitance C3 (not illustrated) of the first and third DC voltage branches DCA1, DCA3 which are not affected will also discharge into the fault location F1.

The first and third capacitances C1, C3 may provide a high (fault) current. If the first device G1 has a low nominal current, for example, the first switching device SCH1 accordingly has small dimensions and can interrupt the current flow even if the fault has occurred in another branch or without continuing to feed the other branch until it is disconnected.

The aim is for the current in the reverse direction of the switching device to be able to be carried as long as possible (without saturation).

This problem has hitherto been solved by greatly overdimensioning the switching devices, which is expensive and uneconomical.

SUMMARY

At least one embodiment of the present invention enables selectivity of the tripping of switching devices in DC voltage branches.

At least one embodiment of the present invention a switching device, wherein a bridging semiconductor switching element is connected in parallel with the series circuit or parallel circuit comprising two (electronic or semiconductor-based) switching modules. The bridging semiconductor switching element is used in this case to conduct the current for an exceptional case, in which the voltage on the DC voltage branch is higher than the voltage on the DC voltage bus, in particular if the difference between the voltages exceeds a threshold value of the voltage.

In one advantageous configuration of at least one embodiment of the invention, a control device is provided, which control device is connected to a control connection of the first semiconductor switching element and second semiconductor switching element or third semiconductor switching element and fourth semiconductor switching element and the bridging semiconductor switching element, in particular to the respective gate connection, to the voltage sensor and to the current sensor and is configured in such a manner that, if a first threshold value of the voltage is undershot and if current flows in the exceptional case, that is to say if, in the case of a thyristor, current flows from the anode-side connection of the thyristor to the cathode-side connection of the thyristor via the switching modules, the bridging semiconductor switching element or the thyristor is switched to the conducting state.

BRIEF DESCRIPTION OF THE DRAWINGS

The described properties, features and advantages of this invention and the manner in which they are achieved become clearer and more distinctly comprehensible in connection with the following description of the exemplary embodiments which are explained in more detail in connection with the drawings.

In the associated drawings.

DETAILED DESCRIPTION OF THE EXAMPLE EMBODIMENTS

Figure 1:
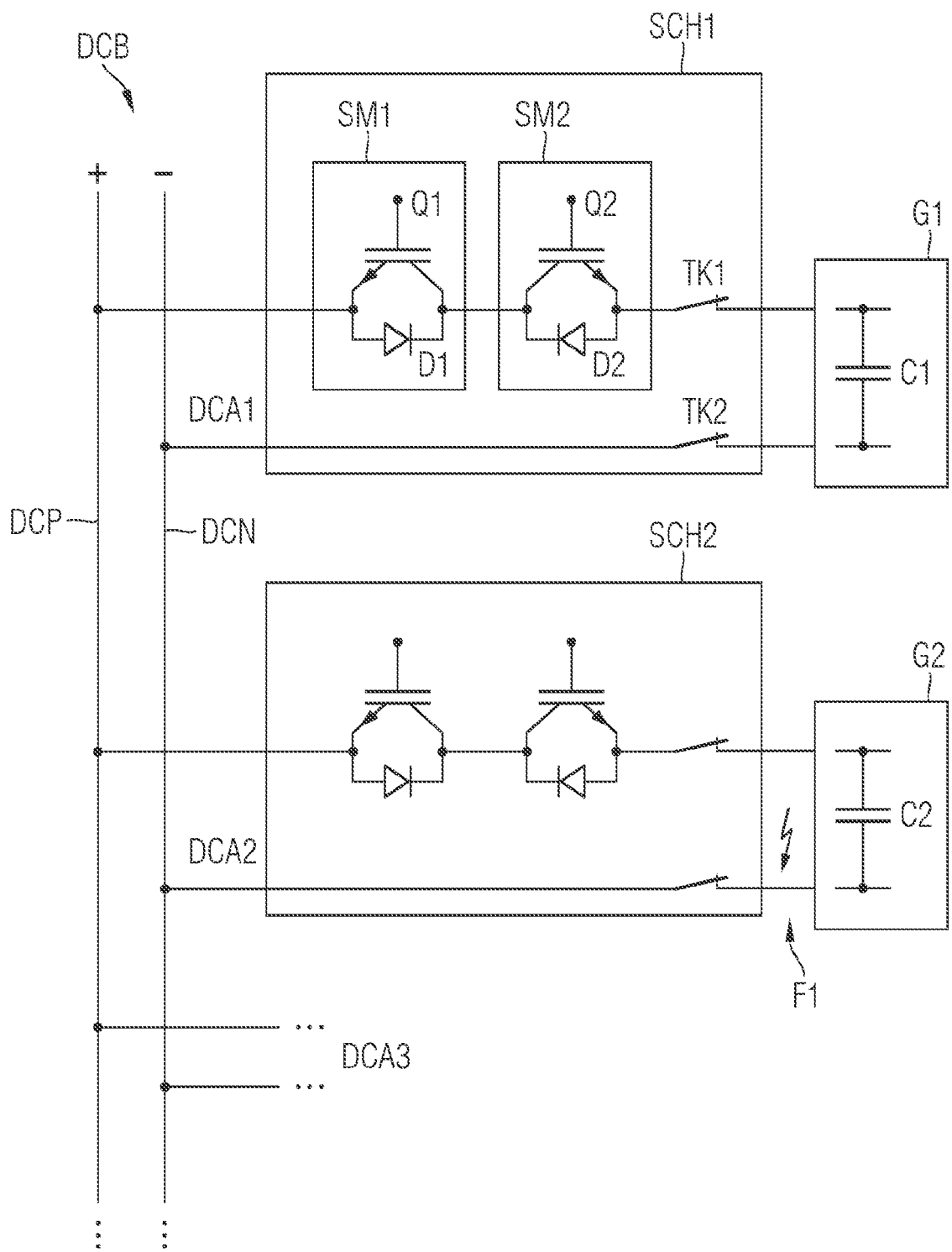
FIG. 1 shows a basic illustration of a DC voltage branch having a switching device on a DC voltage bus according to the prior art.

At least one embodiment of the present invention a switching device.

According to at least one embodiment of the invention, a bridging semiconductor switching element is connected in parallel with the series circuit or parallel circuit comprising two (electronic or semiconductor-based) switching modules. The bridging semiconductor switching element is used in this case to conduct the current for an exceptional case, in which the voltage on the DC voltage branch is higher than the voltage on the DC voltage bus, in particular if the difference between the voltages exceeds a threshold value of the voltage.

In the normal case, a current flows in the positive conductor, for example, from the DC voltage bus to the device via the switching device or the DC voltage branch.

In an exceptional case, a current flows on the positive conductor from the device to the DC voltage bus via the switching device, which is also referred to as the reverse direction.

In a similar manner, in the normal case, a current flows on the negative conductor from the device to the DC voltage bus via the DC voltage branch or the switching device. In the exceptional case, the current flows via the negative conductor from the DC voltage bus to the device via the switching device or the DC voltage branch, that is to say in the reverse direction. In this case, an exceptional case is used to mean a current flow in the reverse direction, which may also be a permissible operating situation.

A bridging semiconductor switching element, which is designed such that it can carry higher currents in one direction, makes it possible for the current in the reverse direction of the switching device to be carried for as long as possible in order to enable tripping of a switching device in another DC voltage branch. The bridging semiconductor switching element is activated in such a case.

Advantageous configurations of the invention are specified in the claims.

In one advantageous configuration of at least one embodiment of the invention, the bridging semiconductor switching element is a thyristor which is arranged in such a manner that it can be switched to the conducting state in order to enable, for example, a current flow in the positive conductor from the device to the DC voltage bus. In a similar manner, a thyristor would be arranged in the negative conductor if the switching modules were arranged in the negative conductor.

The thyristor could be switched to the conducting state if current flows from the anode-side connection of the thyristor to the cathode-side connection of the thyristor via the switching modules, and would be arranged accordingly.

This has the particular advantage that a particularly simple and inexpensive solution is provided for the bridging semiconductor switching element and can conduct high currents, in particular in one direction, without any problems.

In one advantageous configuration of at least one embodiment of the invention, the first or/and second or third or/and fourth semiconductor switching element is/are an insulated gate bipolar transistor, a metal oxide semiconductor field effect transistor, a gallium nitride transistor or a silicon carbide transistor, SiC transistor for short.

This has the particular advantage that a simple solution is provided for the semiconductor switching elements of the switching modules.

In one advantageous configuration of at least one embodiment of the invention, a current sensor which can determine the level of the current and the current direction is provided. A voltage sensor which can determine, in particular, the level of the voltage on the side of the DC voltage bus is also provided.

This has the particular advantage that an integrated and compact solution is provided for a switching device and manages without external sensors.

In one advantageous configuration of at least one embodiment of the invention, a control device is provided, which control device is connected to a control connection of the first semiconductor switching element and second semiconductor switching element or third semiconductor switching element and fourth semiconductor switching element and the bridging semiconductor switching element, in particular to the respective gate connection, to the voltage sensor and to the current sensor and is configured in such a manner that, if a first threshold value of the voltage is undershot and if current flows in the exceptional case, that is to say if, in the case of a thyristor, current flows from the anode-side connection of the thyristor to the cathode-side connection of the thyristor via the switching modules, the bridging semiconductor switching element or the thyristor is switched to the conducting state.

This has the particular advantage that a compact solution with integrated control is provided for a switching device.

In one advantageous configuration of at least one embodiment of the invention, an isolating contact is connected in series, on the DC voltage branch side, with the series circuit or the parallel circuit comprising the two switching modules.

This has the particular advantage that DC-isolation of the DC voltage branch is enabled.

In one advantageous configuration of at least one embodiment of the invention, the parallel circuit comprising the bridging semiconductor switching element has an interruption device, in particular a relay contact, in particular a normally closed contact.

This has the particular advantage that it is possible to reset the current flow in the case of a thyristor or a similar semiconductor switching element.

In one advantageous configuration of at least one embodiment of the invention, the isolating contact or the interruption device can be actuated by the control device, with the result that the current flow through the bridging semiconductor switching element, in particular the thyristor, is resettable or can be reset.

This has the particular advantage that it is possible to reset the current flow through the thyristor, in particular, in a controlled manner via the control device, in particular if further supply of the DC voltage bus by the DC voltage branch is intended to be avoided.

In one advantageous configuration of at least one embodiment of the invention, the first threshold value of the voltage is between 10% and 50% of a nominal voltage of the DC voltage bus, in particular 30% of the nominal voltage of the DC voltage bus.

Alternatively, a second voltage sensor can be used to determine a difference between the level of the voltage of the DC voltage bus and the level of the voltage of the DC voltage branch, which difference is compared with a voltage threshold value or threshold value of the voltage.

This has the particular advantage of a simple criterion for the threshold value of the voltage.

In one advantageous configuration of at least one embodiment of the invention, the current sensor is a sensor based on the Hall effect.

This has the particular advantage that a simple solution for determining the level and the direction of the current is provided.

In one advantageous configuration of at least one embodiment of the invention, in the series circuit comprising the first and second switching modules, the emitters or collectors and sources or drains of the first and second semiconductor switching elements in the form of transistors are connected to one another. The anode of the parallel diode is connected to the emitter or source and the cathode of the parallel diode is connected to the collector or drain.

This has the particular advantage that a simple implementation of a switching module is provided for at least one embodiment of the invention.

In one advantageous configuration of at least one embodiment of the invention, the control device is configured in such a manner that, if a first threshold value of the current is exceeded, in particular in the normal case, the current flow is interrupted by at least one switching module, in particular both switching modules.

This has the particular advantage that the control device provides both an overcurrent protective function and a function according to the invention.

All configurations of embodiments improve a switching device for the purpose of improving selectivity in a DC voltage network. As a result, devices of different power classes, in particular, can be operated from a common DC voltage bus.

FIG. 1 shows a basic illustration of a DC voltage branch having a switching device on a DC voltage bus according to the prior art, as already described at the outset.

Figure 2:
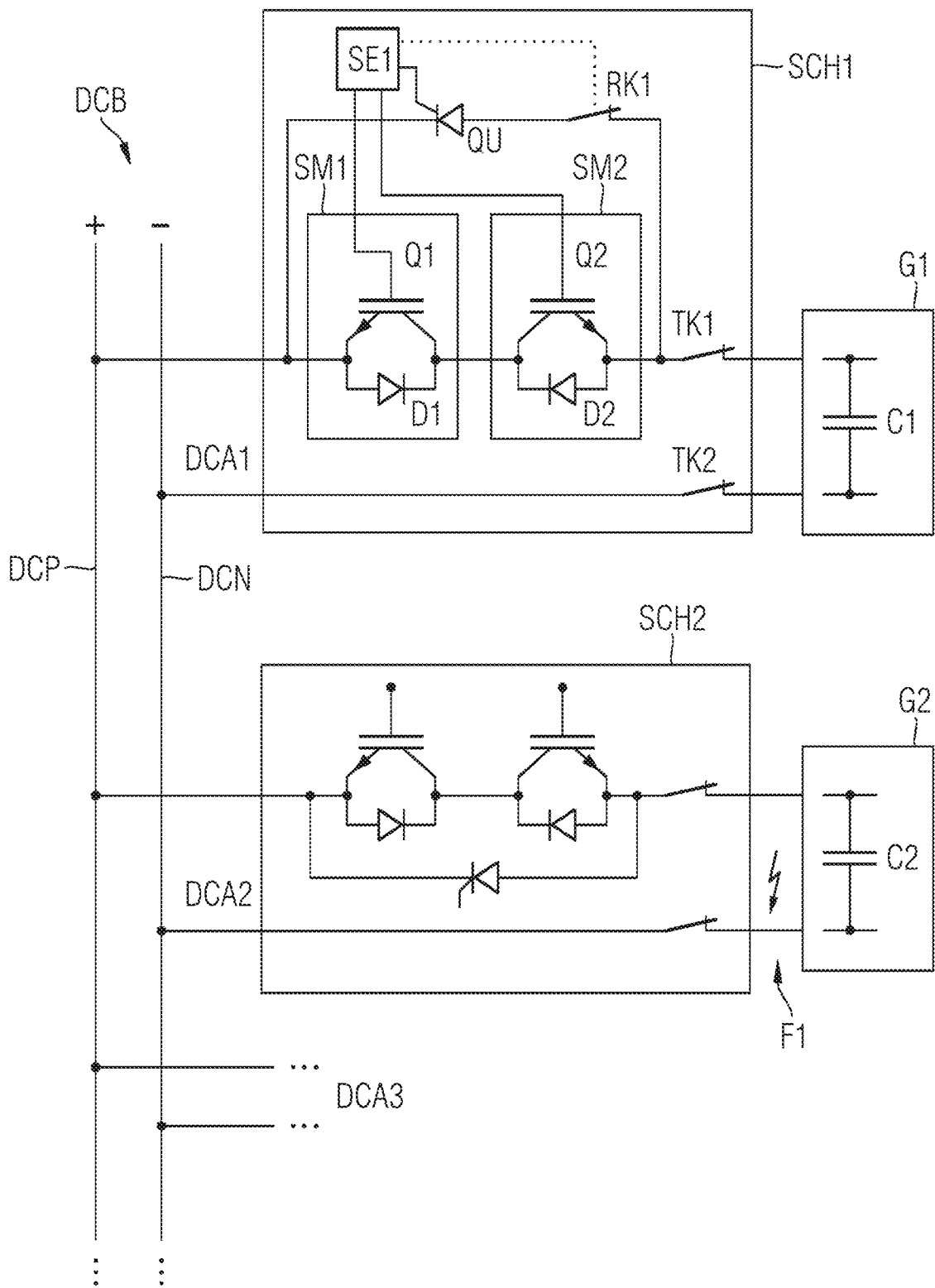
FIG. 2 shows a basic illustration of a DC voltage branch having a switching device on a DC voltage bus according to an embodiment of the invention.

FIG. 2 shows a basic illustration according to FIG. 1, with the difference that, according to an embodiment of the invention, a bridging semiconductor switching element QU, a thyristor in the example according to FIG. 2, is connected in parallel with the series circuit comprising the first and second switching modules SM1, SM2. In this case, the series circuit comprising the two switching modules is arranged in the positive conductor of the first DC voltage branch DCA1. The cathode of the thyristor is connected to the DC voltage bus-side connection of the series circuit comprising the switching modules, which also form the DC voltage bus-side connection of the switching device, and the anode of the thyristor is connected to the device-side connection of the series circuit comprising the switching modules.

In the example, the first or/and second semiconductor switching element Q1, Q2 is/are an insulated gate bipolar transistor, IGBT for short. However, it/they may also be a metal oxide semiconductor field effect transistor or a gallium nitride transistor.

At least one current sensor (not illustrated) which can determine the level of the current and the current direction in the DC voltage branch is also provided. At least one voltage sensor (not illustrated) which can determine, in particular, the level of the voltage in the DC voltage branch on the side of the DC voltage bus is also provided.

A control device SE1 is provided and is connected to a control connection of the first, second and bridging semiconductor switching elements Q1, Q2, QU, in particular to the gate connection. The control device SE1 is also connected to the voltage sensor (not illustrated) and to the current sensor (not illustrated).

The control device SE1 is configured in such a manner that, if a first threshold value of the voltage is undershot and if current flows from the anode-side connection of the thyristor to the cathode-side connection of the thyristor via the switching modules, the thyristor is switched to the conducting state.

An isolating contact is connected in series, on the DC voltage branch side, that is to say on the side of the first device G1, with the series circuit comprising the two switching modules SM1, SM2. In the example, both conductors of the DC voltage branch, that is to say the positive conductor and the negative conductor, have an isolating contact TK1, TK2. The isolating contact has, in particular, an isolating function in line with the standard, that is to say there is safe DC-isolation with distance or/and creepage or air paths in line with the standard.

The isolating contact TK1, TK2 may be in the form of a relay contact which is actuated by the control device SE1.

The parallel circuit comprising the bridging semiconductor switching element QU, the thyristor in the example, has an interruption device RK1, in particular a relay contact, which is in the form of a normally closed contact in the example.

The parallel circuit comprising the bridging semiconductor switching element QU is connected in parallel only with the switching modules, in particular. The first or/and second isolating contact TK1, TK2 is/are not included in the parallel circuit, as illustrated in FIG. 2.

The first and second isolating contacts TK1, TK2 or the interruption device RK1 may be able to be actuated by the control device SE1, with the result that the current flow through the bridging semiconductor switching element, in particular the thyristor QU, can be reset.

The first and second switching modules SM1, SM2 in the series circuit may be configured in such a manner that, depending on the semiconductor switching element used, the emitters or collectors and the sources or drains of the first and second semiconductor switching elements Q1, Q2 are connected to one another. In the example according to FIG. 2, the collectors of the IGBTs are connected to one another. The emitters form respective external connections of the series circuit comprising the switching modules SM1, SM2, wherein a first external connection is connected to the DC voltage bus, possibly via a safety fuse, and the second external connection is connected to the device, possibly via an isolating contact TK1, TK2.

The anode of the parallel diode is connected to the emitter or source and the cathode of the parallel diode is connected to the collector or drain, as illustrated.

The control device is also configured in such a manner that, if a first threshold value of the current is exceeded, in particular if current flows in the normal case (counter to the exceptional case), the current flow is interrupted by at least one switching module, in particular both switching modules.

Figure 3:
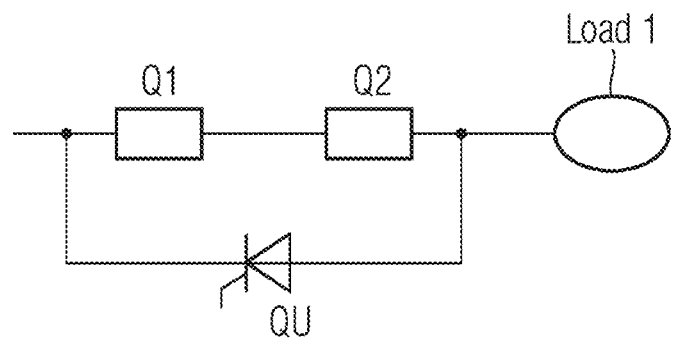
FIG. 3 shows a first schematic illustration of an embodiment of the invention.

FIG. 3 shows a schematic illustration of an embodiment of the invention having the first semiconductor switching element Q1, the second semiconductor switching element Q2 and a first device or load Load1.

A bridging semiconductor switching element QU in the form of a thyristor is connected in parallel with the series circuit comprising the first and second semiconductor switching elements Q1, Q2.

Figure 4:
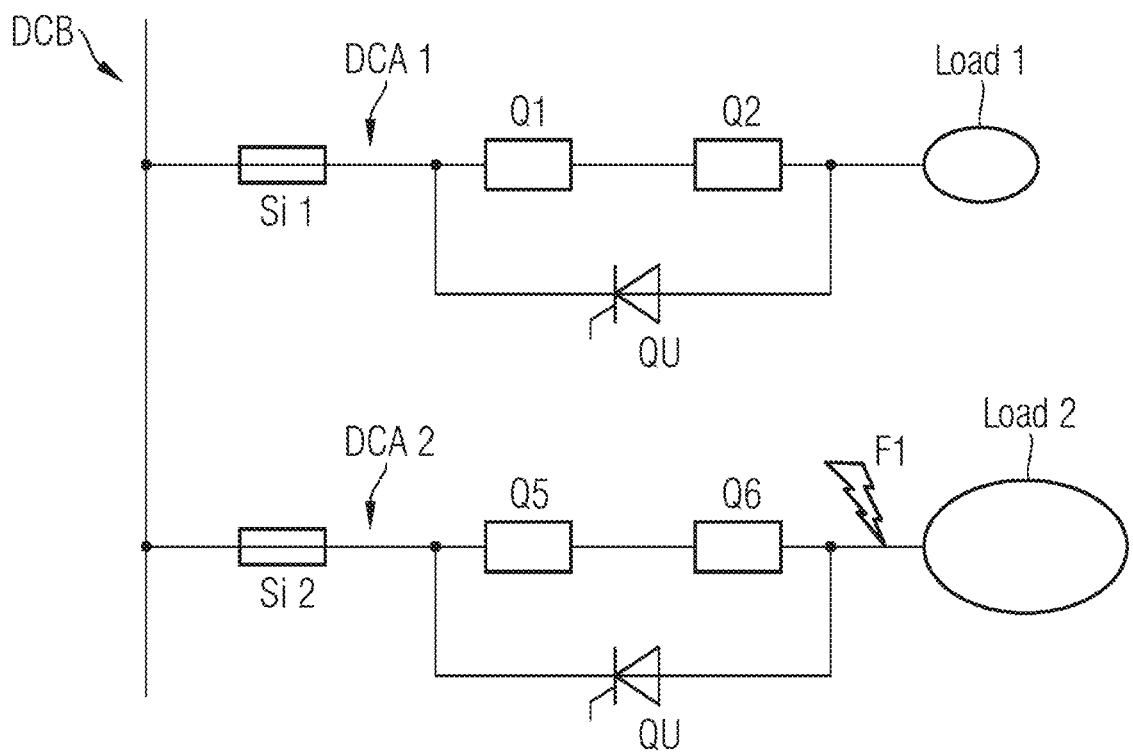
FIG. 4 shows a second schematic illustration of an embodiment of the invention.

FIG. 4 shows a schematic illustration according to FIG. 3, with the difference that the first series circuit comprising the first and second semiconductor switching elements Q1, Q2 is connected via a first safety fuse Si1 to the DC voltage bus DCB, to which a second series circuit is connected in a similar manner via a second safety fuse Si2, the second series circuit comprising fifth and sixth semiconductor switching elements Q5, Q6, with which a second bridging semiconductor switching element QU in the form of a thyristor is connected in parallel, to which a second device or load Load2 is connected.

Figure 5:
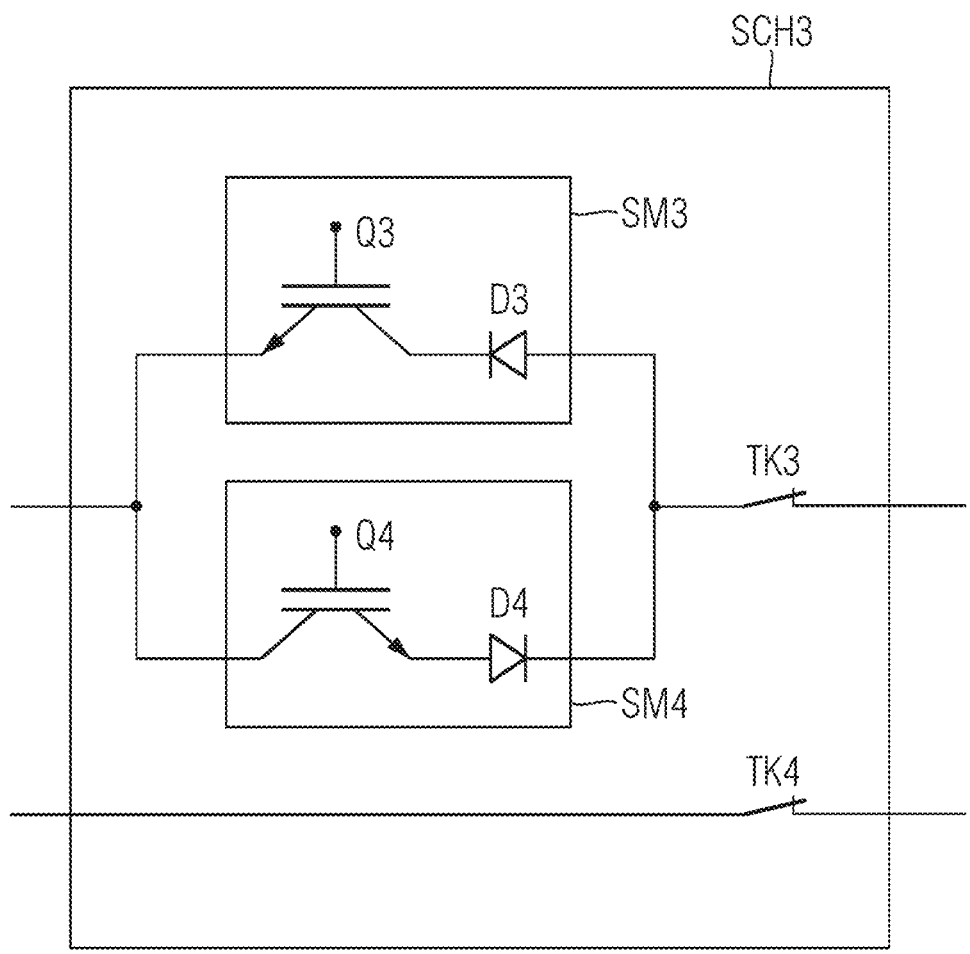
FIG. 5 shows a part of a further switching device.

FIG. 5 shows a third switching device SCH3 for coupling a DC voltage branch to a DC voltage bus according to FIG. 1 and FIG. 2, with the difference that the third switching device SCH3 has a parallel circuit comprising a third switching module SM3 and a fourth switching module SM4, wherein the third switching module SM3 has a series circuit comprising a third controllable semiconductor switching element Q3 and a third diode D3 for the first current direction, and the fourth switching module SM4 has a series circuit comprising a fourth controllable semiconductor switching element Q4 and a fourth diode D4 for the opposite current direction, wherein the third diode D3 is in the blocking state in the opposite current direction and the fourth diode D4 is in the blocking state in the first current direction.

The function of the controllable semiconductor switching element (Q3, Q4) and of the diode (D3, D4) connected in series may also be physically implemented in a semiconductor component. Such a component is referred to as reverse-blocking.

In the example, the parallel circuit is arranged in the positive conductor. It has a third isolating contact TK3 in the positive conductor and a fourth isolating contact TK4 in the negative conductor.

Figure 6:
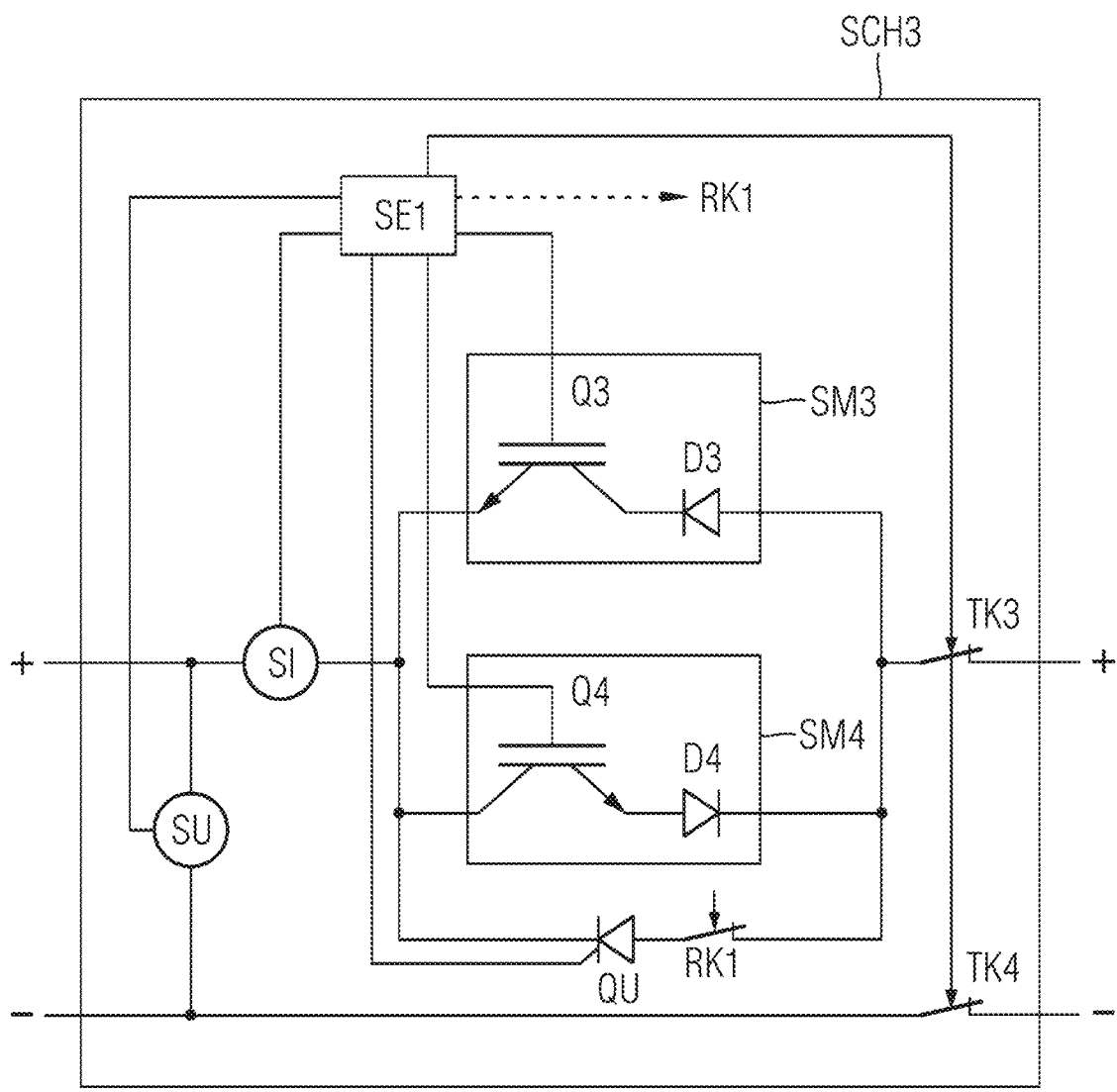
FIG. 6 shows a further switching device according to an embodiment of the invention.

FIG. 6 shows an arrangement according to FIG. 5, with the difference that a bridging semiconductor switching element QU is connected in parallel with the parallel circuit comprising the third and fourth switching modules SM3, SM4.

A current sensor SI is also provided, for example in the positive conductor. A voltage sensor SU is also provided, which voltage sensor is connected to the positive and negative conductors and is arranged, in particular, on the side of the DC voltage bus DCB in order to determine the level of the voltage on the side of the DC voltage bus DCB.

The current sensor SI and the voltage sensor SU are connected to a control device according to FIG. 2. The latter is in turn connected to the third and fourth switching modules SM3, SM4, in particular the control connection thereof, in particular to the gate connection of the third and fourth semiconductor switching elements Q3, Q4, preferably an insulated gate bipolar transistor or the like.

The control device SE1 is connected to the control connection of the bridging semiconductor switching element QU, in particular to the gate connection of the thyristor.

The parallel circuit comprising the bridging semiconductor switching element QU, in particular the thyristor, has an interruption device RK1 which is connected to the switching device SE1, in particular.

In one configuration, the third and fourth isolating contacts TK3, TK4 may be connected to the control device SE1, as illustrated in FIG. 6.

A further DC voltage sensor may be provided on the side of the DC voltage branch, that is to say on the device side, for the purpose of determining the level of the voltage on the side of the device, that is to say on the DC voltage branch side. The sensor may be connected to the control device SE1.

Instead of the first and second switching devices SCH1, SCH2, it is possible to use a switching device according to FIG. 6. DC voltage branches having the first, second and third switching devices SCH1, SCH2, SCH3 may also be provided.

An embodiment of the invention is briefly explained again below.

An electronic bidirectional switching device having semiconductor switches with a freewheeling diode is designed for the operating current and, in the event of a short circuit, can carry a saturation current only for a short time, in the μs range.

Selective disconnection of a faulty branch is made more difficult when feedback currents from other branches are switched off. The aim shall be to carry the current in the reverse direction from a branch for as long as possible without saturation.

For this purpose, it would be necessary to over dimension the switching device. This is an expensive solution.

According to an embodiment of the invention, a further semiconductor switching element, in particular advantageously a thyristor, is provide in order to enable a rapid discharge of the branch into the faulty DC voltage branch via the DC voltage bus.

A bridging thyristor QU is used as a bypass "in the reverse direction" in parallel with the series circuit or parallel circuit comprising the switching modules or semiconductor switching elements or semiconductor switches. If a voltage limit value on the DC voltage bus is undershot (for example 30% of the nominal voltage of the DC voltage bus) and if there is a (high) current from the device into the DC voltage bus via the positive conductor of the DC voltage branch, that is to say in the reverse direction, this thyristor is switched to the conducting state or is triggered.

The switching modules SM1, SM2 and SM3, SM4 or semiconductor switching elements Q1, Q2/Q3, Q4 therefore need not conduct the full (short-circuit) current in the reverse direction; this is undertaken by the bridging (bypass) thyristor QU. This thyristor conducts the (high) (short-circuit) current which therefore provides the faulty DC voltage branch with sufficient energy for disconnection.

After the fault (short circuit) has been eliminated, the switching device is reset. In particular, the bridging thyristor QU is blocked. This takes place either inevitably when the voltage on the DC voltage bus side is greater than the voltage on the DC voltage branch side after the short circuit has been eliminated or can be carried out by opening an interruption device/relay contact RK1 in the line branch of the thyristor or by opening the isolating contacts TK1, TK2 or TK3, TK4.

The switching device SCH1, SCH3 is therefore ready to be switched on again.

An embodiment of the invention makes it possible to achieve improved selectivity in a DC voltage distribution or a DC voltage network having a plurality of branches and distributed capacitances. The switching device of the faulty branch is therefore upgraded for disconnection.

In the application, the bridging (additional) thyristor QU is switched when (short-circuit) currents flowing back from the connected device or its capacitance arise.

An embodiment of the invention makes it possible for the switching modules SM1, SM2, SM3, SM4 or semiconductor switching elements Q1, Q2, Q3, Q4 to have smaller dimensions; the thyristor enables a robust overall structure.

The invention claimed is:

1. A switching device for coupling a DC voltage branch to a DC voltage bus, the switching device comprising:
   a series circuit including a first switching module and a second switching module, the first switching module including
      a first controllable semiconductor switching element for a first current direction, and
   the second switching module including a second controllable semiconductor switching element for an opposite current direction, opposite the first current direction,
   a first diode, in a conducting state in the opposite current direction, connected in parallel with the first controllable semiconductor switching element, and
   a second diode, in a conducting state in the first current direction, connected in parallel with the second controllable semiconductor switching element; and
   a bridging semiconductor switching element, connected in parallel with the series circuit, the series circuit including the first switching module and the second switching module, wherein an isolating contact is connected in series with the series circuit comprising the first and the second switching modules only so that the isolating contact is not included in a parallel circuit comprising the first and second switching modules;
   wherein a current sensor, to determine a level of current and a direction of the current, is provided in the DC voltage branch, wherein a voltage sensor, to determine a level of a voltage on a side of the DC voltage bus, is provided, wherein a control device is provided, the control device being connected to a control connection of the first controllable semiconductor switching element and the second controllable semiconductor switching element and being connected to a control connection of the bridging semiconductor switching element, the voltage sensor and the current sensor, and wherein the control device is configured to, upon a first threshold value of the level of the voltage of the DC voltage bus being undershot and upon current flowing in an exceptional case in which the voltage on the DC voltage branch is higher than the level of the voltage on the DC voltage bus, switch the bridging semiconductor switching element to the conducting state of the bridging semiconductor switching element to facilitate a current flow from the DC voltage branch to the DC voltage bus.

2. A switching device for coupling a DC voltage branch to a DC voltage bus, the switching device comprising:

a parallel circuit including
  a third switching module including a first series circuit including
    a third controllable semiconductor switching element, and
    a third diode for a first current direction, and
  a fourth switching module including a second series circuit including
    a fourth controllable semiconductor switching element, and
    a fourth diode for an opposite current direction, opposite the first current direction, wherein the third diode is in a blocking state in the opposite current direction and the fourth diode is in a blocking state in the first current direction, and wherein a bridging semiconductor switching element is connected in parallel with the parallel circuit including the third switching module and the fourth switching module, wherein an isolating contact is connected in series with the series circuit comprising the third and the fourth switching modules only so that the isolating contact is not included in the parallel circuit, wherein a voltage sensor, to determine a level of a voltage on a side of the DC voltage bus, is provided, wherein a control device is provided, the control device being connected to a control connection of the third controllable semiconductor switching element and the fourth controllable semiconductor switching element and being connected to a control connection of the bridging semiconductor switching element, and the voltage sensor, and wherein the control device is configured to, upon a threshold value of the level of the voltage of the DC voltage bus being undershot and upon current flowing in an exceptional case in which the voltage on the DC voltage branch is higher than the level of the voltage on the DC voltage bus, switch the bridging semiconductor switching element to the conducting state of the bridging semiconductor switching element to facilitate a current flow from the DC voltage branch to the DC voltage bus.

3. The switching device of claim 1, wherein at least one of the first controllable semiconductor switching element and the second controllable semiconductor switching element is an insulated gate bipolar transistor, a metal oxide semiconductor field effect transistor, a gallium nitride transistor or a silicon carbide transistor.

4. The switching device of claim 2,
wherein a current sensor, to determine a level of current and a current direction in the DC voltage branch, is provided.

5. The switching device of claim 1, wherein the isolating contact is connected in series with the series circuit including the first switching module and the second switching module and a parallel circuit including a third switching module and a fourth switching module.

6. The switching device of claim 2, wherein the parallel circuit including the bridging semiconductor switching element, includes an interruption device.

7. The switching device of claim 5, wherein the isolating contact is actuatable by the control device, resulting in the current flow through the bridging semiconductor switching element being resettable.

8. The switching device of claim 1, wherein the current sensor is a sensor based on the Hall effect.

9. The switching device of claim 1,
wherein the first controllable switching element and the second controllable semiconductor switching element are transistors;
wherein, in the series circuit comprising the first switching module and the second switching module, emitters or collectors and sources or drains of the first controllable switching element and the second controllable semiconductor switching element, are connected; and
wherein an anode of the parallel diode is connected to an emitter or source of the first controllable switching element or the second controllable semiconductor switching element, and a cathode of the parallel diode is connected to a collector or drain of the first controllable switching element or the second controllable semiconductor switching element.

10. The switching device of claim 2, wherein at least one of the third controllable semiconductor switching element and the fourth controllable semiconductor switching element is an insulated gate bipolar transistor, a metal oxide semiconductor field effect transistor, a gallium nitride transistor or a silicon carbide transistor.

11. The switching device of claim 8, wherein interruption device is a normally closed relay contact.

12. The switching device of claim 6, wherein the interruption device is actuatable by a control device, resulting in the current flow through the bridging semiconductor switching element being resettable.

* * * * *